United States Patent
Han et al.

(10) Patent No.: US 11,445,506 B2
(45) Date of Patent: Sep. 13, 2022

(54) SECONDARY CELL MANAGEMENT METHOD, CENTRALIZED UNIT, AND BASE STATION

(71) Applicant: ZTE CORPORATION, Guangdong (CN)

(72) Inventors: Jiren Han, Guangdong (CN); Yin Gao, Guangdong (CN)

(73) Assignee: ZTE CORPORATION

( * ) Notice: Subject to any disclaimer, the term of this patent is extended or adjusted under 35 U.S.C. 154(b) by 0 days.

(21) Appl. No.: 16/967,853

(22) PCT Filed: Jan. 14, 2019

(86) PCT No.: PCT/CN2019/071535
§ 371 (c)(1),
(2) Date: Aug. 6, 2020

(87) PCT Pub. No.: WO2019/154018
PCT Pub. Date: Aug. 15, 2019

(65) Prior Publication Data
US 2021/0051642 A1    Feb. 18, 2021

(30) Foreign Application Priority Data
Feb. 9, 2018 (CN) .................. 201810135969.8

(51) Int. Cl.
*H04W 72/04* (2009.01)
*H04W 72/08* (2009.01)
*H04W 88/08* (2009.01)
*H04W 92/12* (2009.01)

(52) U.S. Cl.
CPC ..... *H04W 72/046* (2013.01); *H04W 72/0433* (2013.01); *H04W 72/085* (2013.01); *H04W 88/085* (2013.01); *H04W 92/12* (2013.01)

(58) Field of Classification Search
CPC ...... H04W 72/04; H04W 36/08; H04W 36/02
See application file for complete search history.

(56) References Cited

U.S. PATENT DOCUMENTS

| 10,727,925 | B2 * | 7/2020 | Wang | H04W 24/10 |
| 2018/0048454 | A1 * | 2/2018 | Wang | H04L 5/0096 |
| 2018/0368109 | A1 * | 12/2018 | Kim | H04W 72/04 |

(Continued)

FOREIGN PATENT DOCUMENTS

| CN | 107147482 A | 9/2017 |
| CN | 107484183 A | 12/2017 |
| CN | 108924894 A | 11/2018 |

OTHER PUBLICATIONS

English Translation of International Search Report dated Apr. 3, 2019; International Patent Application No. PCT/CN2019/071535 filed Jan. 14, 2019. ISA/CN.

(Continued)

*Primary Examiner* — Michael T Vu
(74) *Attorney, Agent, or Firm* — McDonald Hopkins LLC

(57) ABSTRACT

Provided are a secondary cell management method, a DU, a CU, and a base station. The method includes: acquiring, by a first network element, first trigger information; and managing, by the first network element, a secondary cell (Scell) for a user equipment (UE) according to the first trigger information.

18 Claims, 3 Drawing Sheets

(56) References Cited

U.S. PATENT DOCUMENTS

2020/0015132 A1* 1/2020 Liu ................. H04W 36/00837

OTHER PUBLICATIONS

Search Report dated Aug. 26, 2021; Chinese Patent Application No. 201810135969.8.
Office Action dated Sep. 3, 2021; Chinese Patent Application No. 201810135969.8.
R3-173816, "Cell Activation and procedure." 3GPP TSG-RAN3#97bis; Prague, Czech Republic. (2017).
R3-180183, "Consideration on UE context management procedures for EN-DC." 3GPP TSG-RAN WG3 NR AdHoc 1801; Sophia Antipolis, France. (2018).
R3-180513, "Consideration on UE context management procedures for EN-DC." 3GPP TSG-RAN WG3 NR AdHoc 1801; Sophia Antipolis, France. (2018).

* cited by examiner

SECONDARY CELL MANAGEMENT METHOD, CENTRALIZED UNIT, AND BASE STATION

CROSS-REFERENCE TO RELATED APPLICATION

This application is a 35 U.S.C. 371 national stage filing of PCT Application No. PCT/CN2019/071535, filed on Jan. 14, 2019, which claims priority to a Chinese patent application No. 201810135969.8 filed at the CNIPA on Feb. 9, 2018, the disclosures of which are incorporated herein by reference in their entireties.

TECHNICAL FIELD

The present application relates to the field of communications and, for example, to a secondary cell management method, a centralized unit (CU), and a base station.

BACKGROUND

The fifth generation mobile communication technology (5G) network architecture in the related art has innovation and networking flexibility, and a base station at a wireless access network side in the 5G network is separated into two functional entities, i.e., a centralized unit (CU) and a distributed unit (DU). Controlling multiple DUs by the CU may implement the baseband centralized processing of a cloud architecture and provide services in a distributed manner for the far-end of users. In the CU-DU separated network architecture, a delay-insensitive network function is placed in the CU, and a delay-sensitive network function is placed in the DU, such that, on the one hand, it saves a lot of core network signaling overhead, and on the other hand, it reduces the switching delay and can enhance mobile performance of the New Radio (NR) system. Transmission and connection between the CU and the DU are performed through an F1 interface.

In the case of carrier aggregation and dual connection, cells under the DU can be divided into primary cells and secondary cells, and the same DU can have multiple secondary cells, but only one primary cell. Cell management includes addition, change and deletion of cells, so as to provide better service quality for the user equipment (UE) in the cell and improve user experience. In the related art, there are only preliminary solutions for the management of the primary cell, but the management of secondary cells is still absent in the industry.

In view of the preceding problem in the related art, no effective solution has yet been proposed.

SUMMARY

Embodiments of the present application provide a secondary cell (SCell) management method, a centralized unit (CU), and a base station.

According to an embodiment of the present application, an SCell management method is provided. The method includes: acquiring, by a first network element, first trigger information; and managing, by the first network element, an SCell for a user equipment (UE) according to the first trigger information.

According to another embodiment of the present application, a CU is provided. The CU includes: an acquisition module, which is configured to acquire first trigger information; and a management module, which is configured to manage an SCell for a UE according to the first trigger information.

According to another embodiment of the present application, a base station is provided. The base station includes a first network element and a second network element. The first network element includes a first processor and a first memory storing an instruction executable by the first processor. The second network element includes a second processor and a second memory storing an instruction executable by the second processor. The first processor is configured to acquire a first measurement report of a UE, and add an SCell to the UE according to the first measurement report, where the first measurement report is used for indicating that network quality of the UE satisfies a first preset condition.

According to another embodiment of the present disclosure, a storage medium is further provided. The storage medium is configured to store a computer program, where when the computer program is executed, the method of any one of embodiments described above is performed.

According to another embodiment of the present disclosure, an electronic apparatus is further provided. The electronic apparatus includes a memory and a processor. The memory is configured to store a computer program, and the processor is configured to execute the computer program to perform the method of any one of embodiments described above.

BRIEF DESCRIPTION OF DRAWINGS

The drawings described herein are used to provide a further understanding of the present application and form a part of the present application. The illustrative embodiments and descriptions thereof in the present application are used to explain the present application and not to limit the present application in any improper way. In the drawings.

DETAILED DESCRIPTION

The present application will be described hereinafter in detail with reference to the drawings and in conjunction with embodiments. It is to be noted that if not in collision, the embodiments described herein and the features in the embodiments may be combined with each other.

It is to be noted that the terms "first", "second" and the like in the description, claims and drawings of the present application are used to distinguish between similar objects and are not necessarily used to describe a particular order or sequence.

Embodiment One

Figure 1:
FIG. 1 is a network architecture diagram according to an embodiment of the present application.
Figure 2:
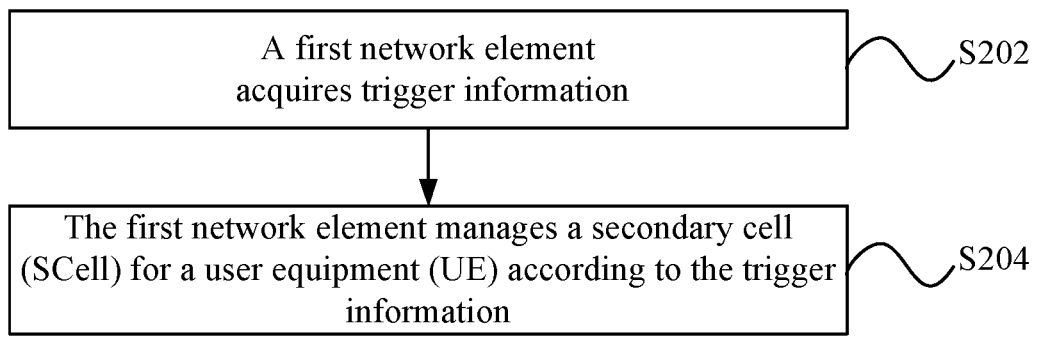
FIG. 2 is a flowchart of a secondary cell management method according to an embodiment of the present application.

This embodiment of the present application may run on a network architecture shown in FIG. 1. As shown in FIG. 1, FIG. 1 is a network architecture diagram according to an embodiment of the present application. The network architecture includes a first network element and a second network element, where the first network element can interact with the second network element. This embodiment provides an SCell management method operating on the network architecture described above. FIG. 2 is a flowchart of a secondary cell management method according to an embodiment of the present application. As shown in FIG. 2, the method includes steps S202 and S204 described below.

In step S202, a first network element acquires trigger information.

In step S204, the first network element manages an SCell for a UE according to the trigger information.

Through the above steps, the difficulty that the SCell cannot be managed in the related art is overcome, the transmission delay between the UE and the base station can be reduced through managing the SCell of the UE, and radio resources are saved.

In one embodiment, the above steps may, but may not necessarily, be executed by the first network element, a CU.

In this embodiment, the management on the SCell includes at least one of: changing the SCell, adding the SCell, and deleting the SCell.

In one example, if the first network element adds an SCell to the UE, the trigger information includes a first measurement report, and the first network element acquires the first measurement report of the UE, where the first measurement report is used for indicating that network quality of the UE satisfies a first preset condition; and the first network element adds the SCell to the UE according to the first measurement report.

In one example, if the first network element deletes an SCell from the UE, the trigger information includes a second measurement report, and the first network element acquires the second measurement report of the UE, where the second measurement report is used for indicating that the network quality of the UE satisfies a second preset condition; and the first network element deletes the SCell from the UE according to the second measurement report.

In one embodiment, when a first SCell does not satisfy a third preset condition, the second network element sends a cause value to the first network element, where the cause value is used by the first network element to reselect the SCell to be changed. According to the description of the preceding implementation, it is apparent to those skilled in the art that the method in the preceding embodiment may be implemented by software plus a necessary generic hardware platform, or may of course be implemented by hardware. However, in many cases, the former is a preferred implementation. Based on such an understanding, the solutions of the present application substantially, or the part contributing to the related art, may be embodied in the form of a software product. The computer software product is stored on a storage medium (such as a read-only memory (ROM)/random access memory (RAM), a magnetic disk or an optical disk) and includes several instructions for enabling a terminal device (which may be a mobile phone, a computer, a server or a network device) to perform the methods according to multiple embodiments of the present application.

Embodiment Two

This embodiment further provides a CU and a base station. These apparatuses are used for implementing the embodiments and application implementation modes described above. What has been described is not repeated herein. As used below, the term "module" may be a combination of at least one of software and hardware capable of implementing predetermined functions. The apparatus in the embodiment described below is preferably implemented by software, but implementation by hardware or by a combination of software and hardware is also possible and conceivable.

Figure 3:
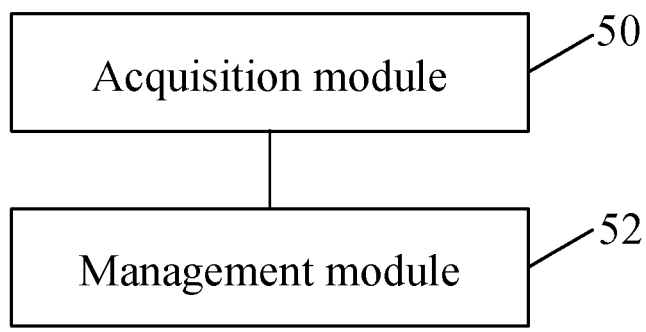
FIG. 3 is a block diagram of a CU according to an embodiment of the present application.

FIG. 3 is a block diagram of a CU according to an embodiment of the present application. As shown in FIG. 3, the apparatus includes an acquisition module 50 and a management module 52. The acquisition module 50 is configured to acquire trigger information.

The management module 52 is configured to manage an SCell for a UE according to the trigger information.

Figure 4:
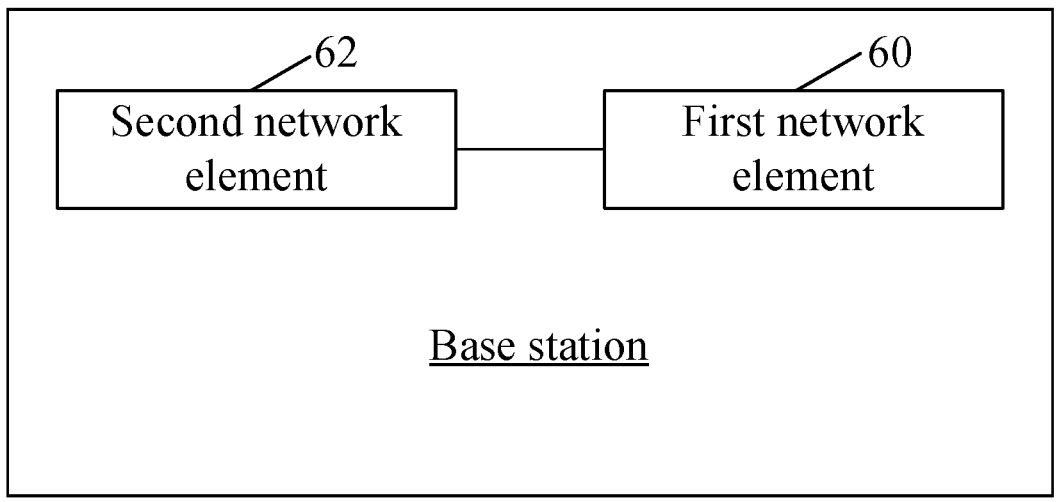
FIG. 4 is a block diagram of a base station according to an embodiment of the present application.

This embodiment further provides a base station. FIG. 4 is a block diagram of a base station according to an embodiment of the present application. As shown in FIG. 4, the base station includes a first network element 60 and a second network element 62. The first network element 60 includes a first processor and a first memory storing an instruction executable by the first processor. The second network element includes a second processor and a second memory storing an instruction executable by the second processor. The first processor is configured to acquire a first measurement report of a UE, and add an SCell to the UE according to the first measurement report, where the first measurement report is used for indicating that the network quality of the UE satisfies the first preset condition.

In an example of the base station, the first processor is configured to send a first change request to the second network element, where the first change request is used for requesting a change to one or more of first SCells; and the second processor is configured to, when the first SCell satisfies the third preset condition, accept the first change request, and change the first SCell, and when the first SCell does not satisfy the third preset condition, refuse to accept the first change request.

In an example of the base station, the second processor is configured to send a second change request to the first network element, where the second change request is used for requesting a change to one or more of second SCells; and the first processor is configured to, when the second SCell is in a preset SCell list, accept the second change request, and change the second SCell, and when the second SCell is not in the preset SCell list, refuse to accept the second change request.

It is to be noted that each module described above may be implemented by software or hardware. Implementation by hardware may, but may not necessarily, be performed in the following manners: the various modules described above are located in the same processor, or each module described above is located in their respective processors in any combination form.

Embodiment Three

This embodiment is applied to the management of the SCell under the CU-DU architecture, which includes the addition, change, deletion and the like of the SCell.

The technical solution of this embodiment includes the following content.

The addition of the SCell is decided by the CU, and the CU performs the addition of the SCell through a measurement report reported by the UE.

The change of the SCell may be decided by the CU.

The CU decides the SCell that needs to be changed, and the DU can only accept or refuse it.

The CU informs the DU through signaling on an F1 interface of information of the SCell which is decided to need to be changed, and if the DU accepts it, the DU carries out relative operation; and if the DU does not accept it, the DU reports a cause value related to the SCell to the CU, so that the CU can select the SCell again.

The deletion of the SCell is decided by the CU, and the CU deletes the SCell through the measurement report reported by the UE.

This embodiment further includes the following implementation modes.

Implementation Mode One

Figure 5:
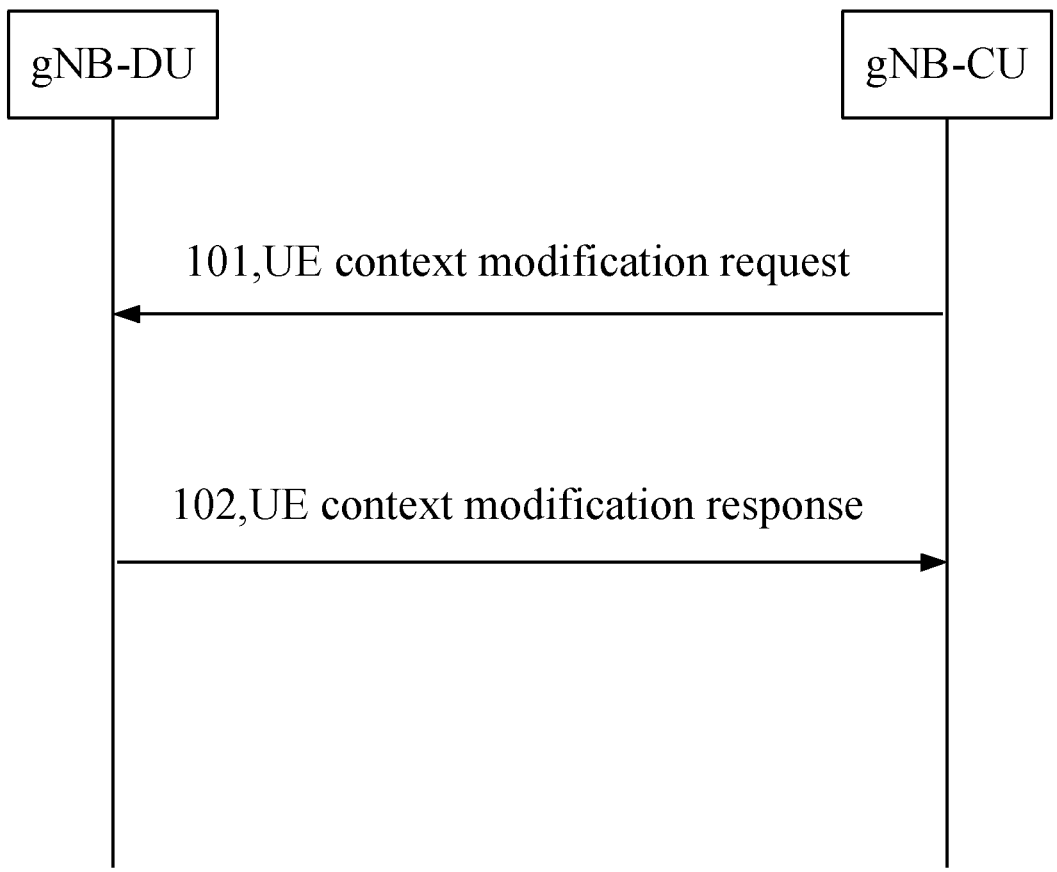
FIG. 5 is a flowchart illustrating that a CU decides to change an SCell and a DU accepts the change in this embodiment.

FIG. 5 is a flowchart illustrating that a CU decides to change an SCell and a DU accepts the change in this embodiment. The flowchart includes steps 101 and 102.

In step 101, the CU sends a UE CONTEXT MODIFICATION REQUEST message to DU through the F1 interface, where the message contains addition/change/deletion of the SCell list. In step 102, the DU accepts the change to the SCell by the CU according to the obtained information and feeds back a UE CONTEXT MODIFICATION RESPONSE message to the CU through the F1 interface.

Implementation Mode Two

Figure 6:
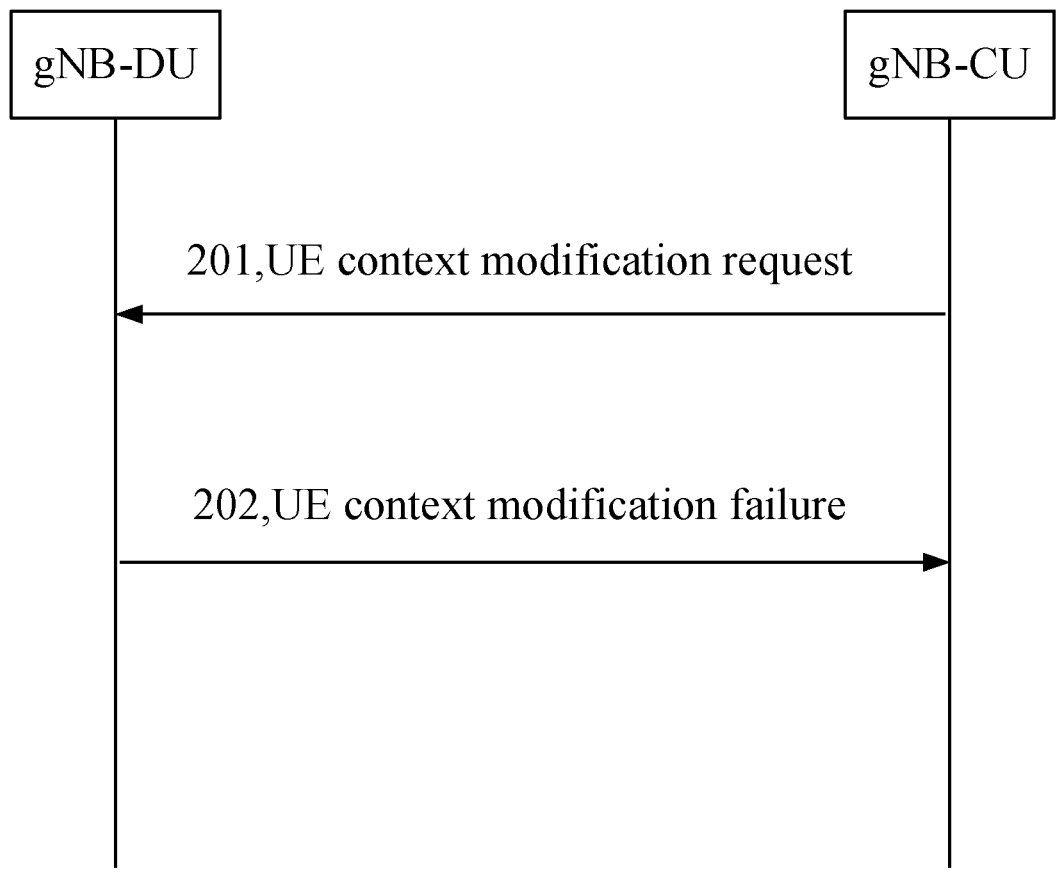
FIG. 6 is a flowchart illustrating that a CU decides to change an SCell but a DU refuses to accept the change in this embodiment.

FIG. 6 is a flowchart illustrating that a CU decides to change an SCell but a DU refuses to accept the change in this embodiment. The flowchart includes steps 201 and 202.

In step 201, the CU sends a UE CONTEXT MODIFICATION REQUEST message to DU through the F1 interface, where the message contains addition/change/deletion of the SCell list. In step 202, the DU refuses the change to the SCell by the CU according to the obtained information and feeds back a UE CONTEXT MODIFICATION FAILURE message to the CU through the F1 interface, where the message contains a cause value of the DU, so that the CU can select the SCell again.

By adopting the method described in the present application, the management of the SCell under the CU-DU architecture is clarified, and the management specifically includes the addition, the change and the deletion of the SCell.

Embodiment Four

An embodiment of the present application further provides a storage medium. The storage medium stores a computer program, where when the computer program is executed, the method of any one of embodiments described above is performed.

In one embodiment, the storage medium may be configured to store a computer program for executing step S1 and step S2.

In step S1, trigger information is acquired.

In step S2, an SCell is managed for a UE according to the trigger information.

In one embodiment, the storage medium may include, but is not limited to, a USB flash disk, a read-only memory (ROM), a random access memory (RAM), a mobile hard disk, a magnetic disk, an optical disk or another medium capable of storing computer programs.

An embodiment of the present application further provides an electronic apparatus. The electronic apparatus includes a memory and a processor. The memory is configured to store a computer program, and the processor is configured to execute the computer program to perform steps of any one of embodiments described above In one embodiment, the preceding electronic apparatus may further include a transmission device and an input/output device, where both the transmission device and the input/output device are connected to the preceding processor.

In one embodiment, the processor may be configured to execute steps S1 and S2 described below through computer programs.

In step S1, trigger information is acquired.

In step S2, an SCell is managed for a UE according to the trigger information.

In one embodiment, for specific examples in this embodiment, reference may be made to the examples described in the embodiments and application implementation modes described above, which will not be repeated in this embodiment.

Apparently, those skilled in the art should understand that various modules or steps described above of the present application may be implemented by a general-purpose computing apparatus, the various modules or steps may be concentrated on a single computing apparatus or distributed on a network composed of multiple computing apparatuses. Optionally, the various modules or steps may be implemented by program codes executable by the computing apparatus, so that the modules or steps may be stored in a storage apparatus for execution by the computing apparatus, and in some circumstances, the illustrated or described steps may be performed in sequences different from those described herein, or the module or steps may be made into various integrated circuit modules separately, or multiple modules or steps therein may be made into a single integrated circuit module for implementation. In this way, the present application is not limited to any particular combination of hardware and software.

What is claimed is:

1. A secondary cell management method, comprising:
acquiring, by a first network element, trigger information; and
managing, by the first network element, a secondary cell (SCell) for a user equipment (UE) according to the trigger information;
wherein the acquiring, by the first network element, the trigger information comprises:
receiving, by the first network element, feedback sent by a second network element, wherein the feedback comprises the second network element refuses a change request sent by the first network element for changing a cell under the second network element to a first SCell;
wherein the managing, by the first network element, the secondary cell for the UE according to the trigger information comprises:
deciding, by the first network element, a SCell change according to the feedback; and
wherein the first network element comprises a centralized unit, the second network element comprises a distributed unit.

2. The method of claim 1, wherein the acquiring, by the first network element, the trigger information comprises:
acquiring, by the first network element, a first measurement report of the UE, wherein the first measurement report is used for indicating that network quality of the UE satisfies a first preset condition, wherein the trigger information comprises the first measurement report.

3. The method of claim 2, wherein the managing, by the first network element, the SCell for the UE according to the trigger information comprises:

adding, by the first network element, an SCell to the UE according to the first measurement report.

4. The method of claim 1, wherein the acquiring, by the first network element, the trigger information comprises:
acquiring, by the first network element, a second measurement report of the UE, wherein the second measurement report is used for indicating that the network quality of the UE satisfies a second preset condition, wherein the trigger information comprises the second measurement report.

5. The method of claim 4, wherein the managing, by the first network element, the SCell for the UE according to the trigger information comprises:
deleting, by the first network element, an SCell from the UE according to the second measurement report.

6. An electronic apparatus, comprising a memory and a processor, wherein the memory stores a computer program, and the processor is configured to execute the computer program to perform the method of claim 1.

7. A base station, comprising a first network element and a second network element, wherein the first network element comprises a first processor and a first memory storing an instruction executable by the first processor, and the second network element comprises a second processor and a second memory storing an instruction executable by the second processor;
wherein the first processor is configured to acquire a first measurement report of a user equipment (UE), and add a secondary cell (SCell) to the UE according to the first measurement report, wherein the first measurement report is used for indicating that network quality of the UE satisfies a first preset condition;
wherein the first processor is configured to receive feedback sent by the second processor, wherein the feedback comprises the second network element refuses a change request sent by the first processor for changing a cell under the second network element to a first SCell;
wherein the first processor is configured to decide a SCell change according to the feedback; and
wherein the first network element comprises a centralized unit, the second network element comprises a distributed unit.

8. The base station of claim 7, wherein
the first processor is configured to acquire a second measurement report of the UE, and delete an SCell from the UE according to the second measurement report, wherein the second measurement report is used for indicating that the network quality of the UE satisfies a second preset condition.

9. The base station of claim 7, wherein
the first processor is configured to send the change request to the second network element, wherein the change request is used for requesting to change to the first SCell.

10. The base station of claim 7, wherein
the first processor is configured to, in response to a second SCell being in a preset SCell list, decide to change the first SCell to the second SCell.

11. A non-transitory storage medium storing a computer program, wherein when the computer program is executed, the method of claim 1 is performed.

12. A secondary cell management method, comprising:
performing, by a first network element, management on a secondary cell (SCell) under a second network element through a first interface message; and
wherein the management on the SCell comprises:
requesting, by the first network element, to change the SCell at the second network element;
wherein the requesting, by the first network element, to change the SCell at the second network element comprises:
sending, by the first network element, a change request for requesting to change a cell under the second network element to a first SCell to the second network element; and
in response to the second network element refuses the change request, deciding, by the first network element, a SCell change; and
wherein the first network element comprises a centralized unit, the second network element comprises a distributed unit.

13. The method of claim 12, wherein the first interface message comprises: an UE CONTEXT MODIFICATION REQUEST message.

14. The method of claim 12, wherein messages carried in the first interface message comprise at least one of:
an SCell list to be added, an SCell list to be changed, an SCell list to be deleted.

15. The method of claim 12, after the second network element obtains the first interface message, the second network element sends a response message to the first network element and is configured to perform one of:
accepting, by the second network element, to change to the first SCell; or
refusing, by the second network element, to change to the first SCell.

16. The method of claim 12, wherein the management on the SCell further comprises at least one of:
requesting, by the first network element, to add the SCell at the second network element; or
requesting, by the first network element, to delete the SCell at the second network element.

17. The method of claim 12, wherein in response to the second network element refuses the change request, the method further comprises:
receiving, by the first network element, a cause value reported by the second network element that the second network element refuses to change to the first SCell.

18. The method of claim 12, wherein after sending, by the first network element, the change request for requesting to change the cell under the second network element to the first SCell to the second network element, the method further comprises:
in response to the second network element accepts the change request, changing to the first SCell is accepted by the second network element.

* * * * *